(12) United States Patent
Trewin

(10) Patent No.: US 8,850,363 B2
(45) Date of Patent: *Sep. 30, 2014

(54) TECHNIQUES FOR CHOOSING A POSITION ON A DISPLAY HAVING A CURSOR

(75) Inventor: Sharon M. Trewin, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 1136 days.

This patent is subject to a terminal disclaimer.

(21) Appl. No.: 12/141,393

(22) Filed: Jun. 18, 2008

(65) Prior Publication Data

US 2008/0256493 A1   Oct. 16, 2008

Related U.S. Application Data

(63) Continuation of application No. 11/375,784, filed on Mar. 15, 2006, now Pat. No. 7,523,418.

(51) Int. Cl.
*G06F 3/048* (2013.01)
*G06F 3/0481* (2013.01)
*G06F 3/0484* (2013.01)

(52) U.S. Cl.
CPC ........ *G06F 3/04812* (2013.01); *G06F 3/04842* (2013.01)
USPC ........... 715/856; 715/857; 715/858; 715/865; 345/157

(58) Field of Classification Search
USPC .................. 345/157; 715/856, 857, 858, 865
See application file for complete search history.

(56) References Cited

U.S. PATENT DOCUMENTS

| 4,386,346 | A | * | 5/1983 | Levine | 345/159 |
| 4,734,685 | A | * | 3/1988 | Watanabe | 345/157 |
| 5,164,713 | A | * | 11/1992 | Bain | 715/862 |
| 5,191,641 | A | * | 3/1993 | Yamamoto et al. | 345/418 |
| 5,398,044 | A | * | 3/1995 | Hill | 715/857 |
| 5,694,123 | A | * | 12/1997 | Selker et al. | 341/22 |
| 5,710,574 | A | * | 1/1998 | Jaaskelainen, Jr. | 715/856 |

(Continued)

FOREIGN PATENT DOCUMENTS

| DE | 19836000 | 2/2000 | ................ G06F 3/02 |
| DE | 10213282 | 5/2003 | .............. G06F 3/033 |
| WO | WO 00/36496 | 6/2000 | |

OTHER PUBLICATIONS

Hourcade, et al., "Differences in Pointing Task Performance Between Preschool Children and Adults Using Mice," University of Maryland, ACM Transactions on Computer-Human Interaction, vol. 11, No. 4, pp. 357-386 (Dec. 2004).

(Continued)

*Primary Examiner* — Steven Sax
*Assistant Examiner* — David Choi
(74) *Attorney, Agent, or Firm* — Ryan, Mason & Lewis, LLP

(57) ABSTRACT

Techniques are provided for choosing a position on a display having a cursor. In one aspect, an exemplary method, which can be computer-implemented, includes the steps of automatically moving the cursor in a predetermined during-selection mode in response to a first user-initiated action, and, responsive to a second user-initiated action when the cursor is at a first location, ceasing the moving of the cursor in the predetermined during-selection mode, and causing a choosing action to be performed at the first location, such that the first location is chosen as the position

17 Claims, 11 Drawing Sheets

(56) References Cited

U.S. PATENT DOCUMENTS

| | | | |
|---|---|---|---|
| 5,757,358 A * | 5/1998 | Osga | 715/862 |
| 5,786,805 A * | 7/1998 | Barry | 345/159 |
| 5,808,604 A | 9/1998 | Robin | 715/862 |
| 5,870,079 A * | 2/1999 | Hennessy | 345/159 |
| 5,910,798 A * | 6/1999 | Kim | 345/163 |
| 5,990,862 A * | 11/1999 | Lewis | 715/858 |
| 6,014,140 A * | 1/2000 | Strand | 345/684 |
| 6,031,531 A * | 2/2000 | Kimble | 715/862 |
| 6,064,401 A * | 5/2000 | Holzman et al. | 345/440 |
| 6,128,005 A * | 10/2000 | Kato | 345/163 |
| 6,137,472 A * | 10/2000 | Pekelney et al. | 715/858 |
| 6,252,604 B1 | 6/2001 | Snyder et al. | 345/619 |
| 6,295,049 B1 * | 9/2001 | Minner | 715/856 |
| 6,466,197 B1 * | 10/2002 | Kim et al. | 345/156 |
| 6,587,131 B1 * | 7/2003 | Nakai et al. | 715/857 |
| 6,867,790 B1 * | 3/2005 | Brooks | 715/856 |
| 7,193,609 B2 * | 3/2007 | Lira | 345/157 |
| 7,523,418 B2 * | 4/2009 | Trewin | 715/858 |
| 2003/0197744 A1 | 10/2003 | Irvine | 345/856 |
| 2004/0151218 A1 | 8/2004 | Branzoi et al. | 372/25 |
| 2004/0189714 A1 | 9/2004 | Fox et al. | 345/810 |
| 2005/0216866 A1 | 9/2005 | Rosen et al. | 715/856 |
| 2006/0288314 A1 * | 12/2006 | Robertson | 715/863 |
| 2008/0256493 A1 * | 10/2008 | Trewin | 715/858 |
| 2011/0191674 A1 * | 8/2011 | Rawley et al. | 715/702 |

OTHER PUBLICATIONS

Wisebrod, Dov, "Skeleton Key," http://www.myskeletonkey.com Printed Jan. 3, 2006 by Paul J. Otterstedt, Reg. No. 37,411.

* cited by examiner

FIG. 7
AUTOMOVE PROFILE

- profileMT: MOVEMENT TRAJECTORY
- profileStartVelocity: INITIAL MOVEMENT VELOCITY
- profileAP: ACCELERATION PROFILE
- profileReverse: FLAG INDICATING WHETHER TO REVERSE MOVEMENT WHEN END OF TRAJECTORY IS REACHED
- profileReptitions: NUMBER OF TIMES TO REPEAT MOVEMENT WHEN END OF TRAJECTORY OR REVERSE TRAJECTORY IS REACHED
- profileRtnToOrigin: FLAG INDICATING WHETHER CURSOR SHOULD BE RETURNED TO ITS STARTING POSITION AT THE END OF THE MOVEMENT

FIG. 8
AUTOMOVE MOVEMENT STATUS

- current MvntPos: LOCATION WITHIN MOVEMENT TRAJECTORY
- currentDir: DIRECTION OF MOVEMENT WITHIN TRAJECTORY
- currentVelocity: VELOCITY OF MOVEMENT
- currentAccelPos: LOCATION WITHIN ACCELERATION PROFILE
- currentRepsDone: NUMBER OF REPETITIONS COMPLETED
- currentStartPos: Cursor start position

TECHNIQUES FOR CHOOSING A POSITION ON A DISPLAY HAVING A CURSOR

CROSS REFERENCE TO RELATED APPLICATIONS

This application is a continuation of U.S. patent application Ser. No. 11/375,784, filed Mar. 15, 2006, now U.S. Pat. No. 7,523,418, incorporated by reference herein.

FIELD OF THE INVENTION

The present invention generally relates to information technology and data processing, and, more particularly, to techniques for choosing a position on a display having a cursor.

BACKGROUND OF THE INVENTION

A common method for interacting with computer systems is to use a pointing device such as a mouse to locate and click on areas of a graphical user interface (GUI), in order to activate desired functions of that GUI. Sometimes users are required to precisely position the on-screen cursor over a very small screen area If the desired screen area is very small, or if the user is in a moving environment such as a train, or if the user has a physical impairment that affects his or her motor skills, it may be very difficult to accurately point at and click on the desired screen area.

US Patent Publication No 20050216866 of Rosen et al discloses a system for replacing a cursor image in connection with displaying the contents of a web page In particular, the Rosen et al reference teaches a system for modifying a cursor image, as displayed on a video monitor of a remote terminal, to a specific image having a desired shape and appearance The system stores cursor image data corresponding to the specific image, and a cursor display code. The cursor display code contains information in response to which the cursor image is modified to the specific image. A server computer transmits specified information to the remote terminal. The information includes at least one cursor display instruction. The cursor display instruction is operable to modify, in conjunction with the cursor information and the cursor image data, a cursor image displayed by a display of the remote terminal in the shape and appearance of the specific image.

Rosen et al. teach that the position, as well as the image, of the user terminal's cursor may be controlled by a remote server. Additional information could be passed to a Cursor Display Code via Cursor Display Instructions The additional information passed to the Cursor Display Code would contain code which indicates: (1) that the cursor position control is intended, (2) the conditions under which the cursor should be moved, and (3) the source of the data which specifies the particular movement that is intended. The latter could be stored in memory on a remote server and retrieved in a manner similar to retrieving Cursor Display Instructions or the Cursor Display Code For example, if no user input is received for a specified interval, the cursor image could change and the position of the cursor could be set such that it follows a specified trajectory for several seconds, then reverts to its original state.

Rosen et al do not teach any method of target acquisition

It would be desirable to overcome the limitations in previous approaches.

SUMMARY OF THE INVENTION

Principles of the present invention provide techniques for choosing a position on a display having a cursor In one aspect, an exemplary method, which can be computer-implemented, includes the steps of automatically moving the cursor in a predetermined during-selection mode in response to a first user-initiated action, and, responsive to a second user-initiated action when the cursor is at a first location, ceasing the moving of the cursor in the predetermined during-selection mode, and causing a choosing action to be performed at the first location, such that the first location is chosen as the position.

In another aspect, another exemplary method, which can also be computer-implemented, can include the steps of automatically moving the cursor in a predetermined manner (such as a pre-selection mode) in response to a pause in user-initiated cursor motion, and, responsive to a user-initiated action when the cursor is at a first location, ceasing the moving of the cursor in the predetermined manner, and causing a choosing action to be performed at the first location, such that the first location is chosen as the position. The two exemplary methods can be combined; in one example of such a combination, the choosing action performed in the exemplary method described in this paragraph can correspond to commencement of the automatic motion of the cursor in the predetermined during-selection mode.

One or more embodiments of the invention can be implemented in the form of a computer product including a computer usable medium with computer usable program code for performing the method steps indicated. Furthermore, one or more embodiments of the invention can be implemented in the form of an apparatus including a memory and at least one processor that is coupled to the memory and operative to perform exemplary method steps.

One or more embodiments of the invention may provide one or more beneficial technical effects, such as, for example, seamless combination of user- and system-controlled movement to provide a point-and-click method that is independent of the targets on the display.

These and other objects, features and advantages of the present invention will become apparent from the following detailed description of illustrative embodiments thereof, which is to be read in connection with the accompanying drawings

BRIEF DESCRIPTION OF THE DRAWINGS

FIG. 7 depicts exemplary aspects of an automatic move profile according to an embodiment of the invention;

FIG. 8 depicts exemplary aspects of automatic movement status according to an embodiment of the invention;

DETAILED DESCRIPTION OF PREFERRED EMBODIMENTS

Figure 1:
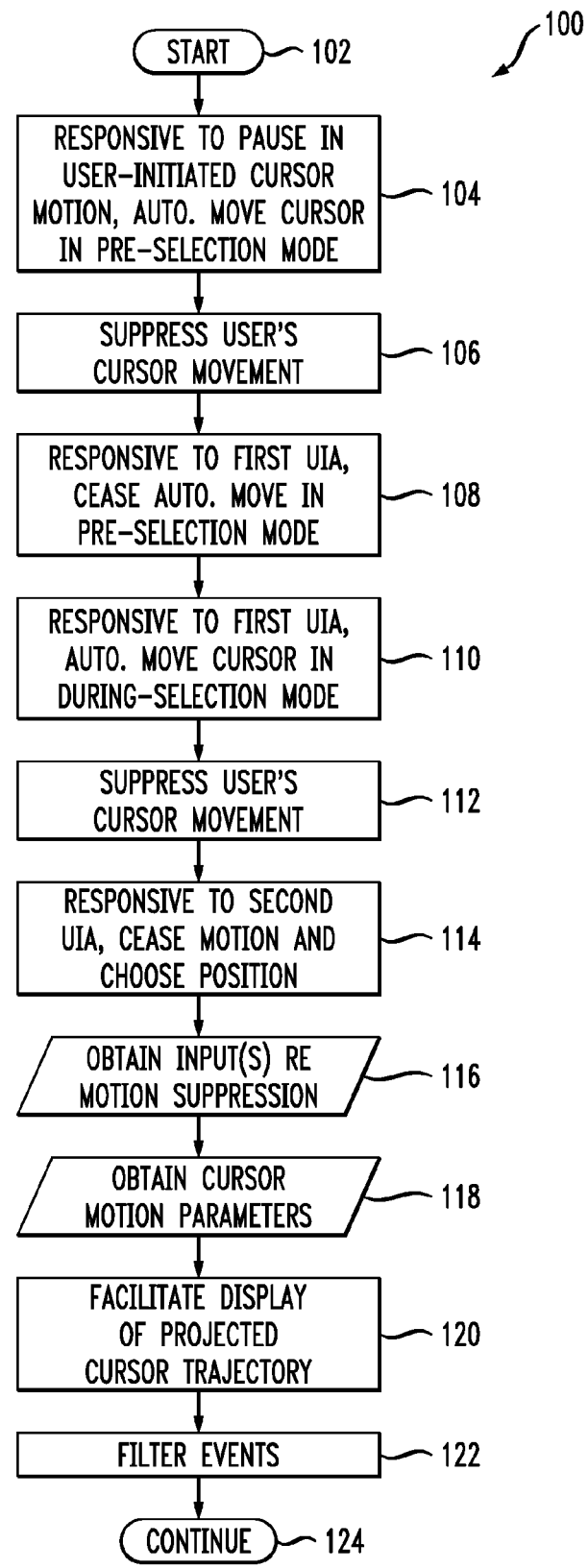
FIG. 1 is a high level flow chart depicting exemplary method steps for choosing a position on a display having a cursor according to an aspect of the present invention.

FIG. 1 shows a flow chart 100 of exemplary method steps in a method (which can be computer-implemented) for choosing at least one position on a display having a cursor, according to one aspect of the invention. After beginning at block 102, the method can include the steps of, automatically moving the cursor in a predetermined during-selection mode responsive to a first user-initiated action (e.g., holding down a mouse button), as shown at block 110, and responsive to a second user-initiated action (e.g., releasing a mouse button) when the cursor is at a first location, ceasing the moving of the cursor in the predetermined during-selection mode, and causing a choosing action to be performed at the first location, such that the first location is chosen as the at least one position, as shown at block 114. The abbreviation "UIA" is used in the figure for "user-initiated action."

In addition to or in lieu of the just-described steps, as shown at block 104, the cursor can be automatically moved in a predetermined manner responsive to, e.g., a pause in user-initiated cursor motion (the automatic movement could also be in response to an explicit user action, as discussed further below). As shown at block 108, responsive to a user-initiated action (e.g., clicking a mouse button) when the cursor is at a first location, the moving of the cursor in the predetermined manner can cease and a choosing action can be caused to be performed at the first location, such that the first location is chosen as the at least one position. Steps 104 and 108 can be performed independently of steps 110 and 114 as a computer-implemented method of choosing at least one position on a display having a cursor. As discussed in the next paragraph, one purpose for choosing the position is to initiate a selection.

In general, the exemplary steps depicted in FIG. 1 can be performed in any appropriate order, and one or more steps can be added or omitted. In one exemplary embodiment, steps 104 and 108 are associated with a pie-selection automated movement prior to steps 110 and 114, associated with automated movement during selection. In this case, the automatic motion of the cursor in block 104 can be a predetermined pre-selection mode of motion. Further, the user-initiated action referred to in step 108 can be the first user-initiated action of block 110, and the choosing action mentioned in to connection with block 108 can correspond to commencing the automatic moving of the cursor in the predetermined during-selection mode.

Certain additional optional steps will now be discussed. As shown at blocks 106 and 112, user-inputted cursor movement can be suppressed during the predetermined during-selection and/or pre-selection modes of moving the cursor An appropriate input causing one or both of the predetermined during-selection and pre-selection modes of motion to become inactive can be obtained at block 116 As per block 118, cursor motion parameters can be obtained. For example, the predetermined during-selection mode of motion can be determined by parameters indicative of one or more of trajectory, initial velocity, acceleration profile, number of repetitions, reversal of direction, end location, and on-screen appearance; appropriate parameters could also be obtained for the pre-selection mode of motion.

The user-initiated cursor motion can be accomplished via a human-operated pointing device such as a mouse, trackball, joystick, or the like The first user-initiated action can be effected via depressing a button (broadly understood to include a key) on, e.g., a keypad or a pointing device The second user-initiated action can include releasing a button (again, broadly understood to include a key) on a keypad or a pointing device. Of course, separate actions are possible, such as, e.g., pressing the same (or different) buttons or keys to start and to stop. Further, as noted, step 104 could be initiated in response to an explicit user action, such as, e.g., depressing or releasing a button or key, in lieu of or in combination with the pause in user-initiated cursor motion. The explicit user action and/or pause in user-initiated cursor motion are referred to generally as a pre-selection automatic movement-initiating action.

As shown at block 120, another optional step includes facilitating display of a projected cursor trajectory in accordance with one or both of the predetermined during-selection and pre-selection modes of moving the cursor. As used herein, "facilitating" an action includes performing the action, making the action easier, helping to carry the action out, or causing the action to be performed One or both of the predetermined during-selection and pre-selection modes of moving the cursor can be cancelled in response to obtaining a user-inputted cursor movement during, respectively, the predetermined during-selection or pre-selection modes of moving the cursor. Further, if desired, user-inputted cursor movement can be suppressed during one or both of the predetermined during-selection and pre-selection modes of moving the cursor, until the user-inputted cursor movement reaches a threshold, and then, responsive to the user-inputted cursor movement reaching the threshold, one or both of the predetermined during-selection and pie-selection modes of moving the cursor can be cancelled As will be discussed in greater detail below, the display can be associated with a computer having a pointing device and an operating system, and as shown at block 122, the additional step of filtering a stream of events passing from the pointing device to the operating system can be performed. In addition to the operating system, filtering a stream of events passing from the pointing device to one or more running applications is also possible. While depicted as a separate step in FIG. 1, such filtering can be an integral aspect of the way a solution implementing certain techniques of the invention is set up Processing can continue at block 124.

Figure 2:
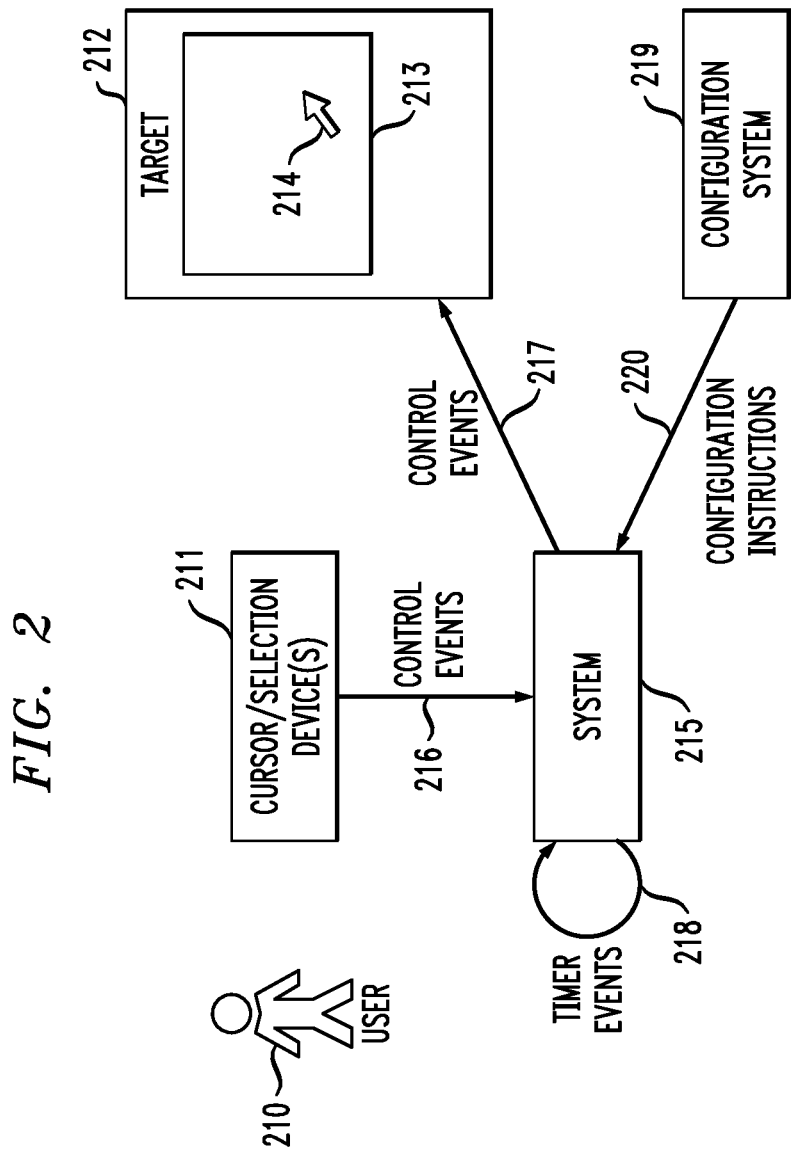
FIG. 2 is an overview of a system employing techniques of an embodiment of the invention.

Certain aspects of one or more detailed exemplary embodiments of the invention will now be discussed. It is to be emphasized that the detailed embodiment(s) discussed with respect to FIGS. 2-14 are intended to be exemplary, not limiting, and that other embodiments of the invention are possible given the teachings presented herein. FIG. 2 shows the main actors involved in the interaction There is a user 210 who may have a disability that affects motor control, speech or other function, or may be in a situation that affects his or her abilities in these areas (e.g. driving a car affects your ability to operate a push button device). There is a cursor/selection device 211 that the user operates. This may be a physical device such as a keyboard, mouse or binary switch, or it may be less tangible, such as speech input, which would be represented by a microphone and speech recognition software. It may be composed of more than one physical/software device, such as a trackball and separate switch The user wishes to use the cursor/selection device in older to control a target 212. This may be a personal computer, a household appliance (in which the input device may be physically built in to the target) or a service provided over the Internet via the user's device. The cursor/selection device may be separate from or integrated with the target.

The target has a display 213 on which appears a cursor 214, which marks the current position on the display. The cursor/selection device 211 is used to move this cursor, and to select objects on the display. It generates control events 216. A system 215 can implement one or more techniques of the invention System 215 is connected to the output of the cursor/selection device 216 and provides control events 217 to the target The system 215 modifies some control events, generates some control events, and passes some control events on to the target unchanged. The output is handled on the target in the way it would normally be handled. In addition, the system generates and consumes timer events 218 The system 215 can be configured through the configuration system 219, which sends configuration instructions 220 to the system 215.

Figure 3:
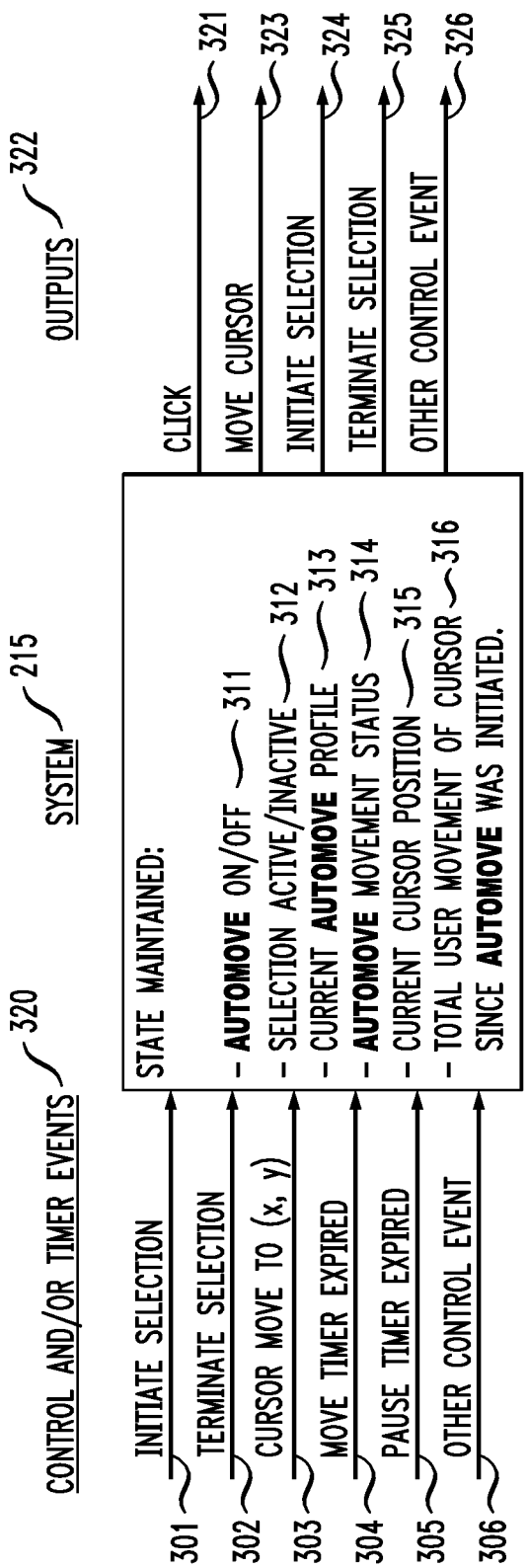
FIG. 3 depicts exemplary system inputs and outputs.

FIG. 3 illustrates the inputs 320 and outputs 322 of the system 215 in more detail. Of note are control events that initiate selection actions on the target 301, terminate selection actions on the target 302, and move the cursor position on the target display 303. All other control events 306 generated by the cursor/selection device 211 are passed on to the target unchanged by the system 215. The system 215 also receives and acts on events 304 and 305 indicating that timers have expired. Two timers are employed—a move timer which is used to control automatic cursor movement, and a pause timer, which expires when a certain time has elapsed since the user last moved the cursor, and indicates when to start a pre-selection movement.

Figure 4:
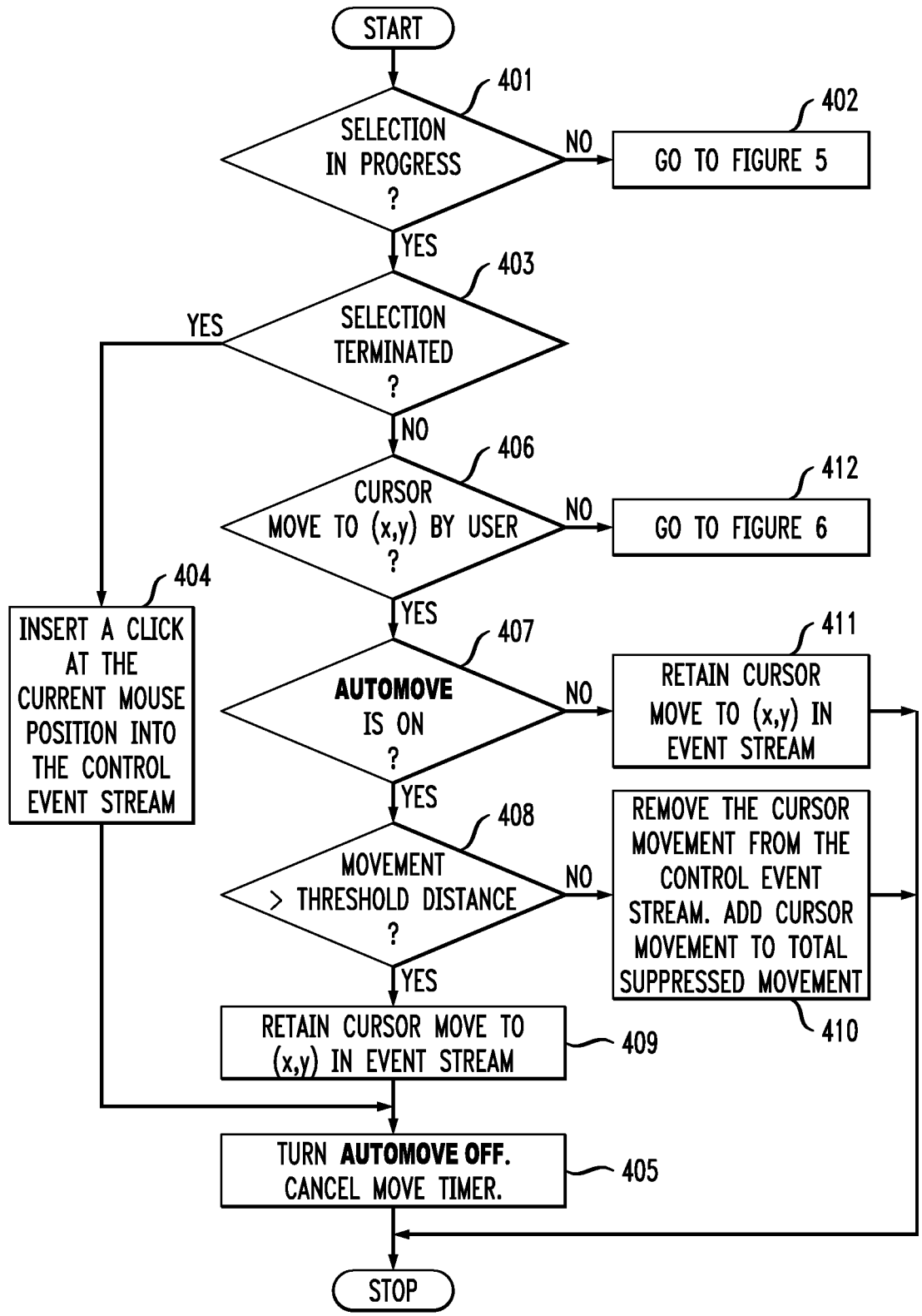
FIG. 4 is a flow chart of exemplary detailed method steps according to an aspect of the present invention.
Figure 5:
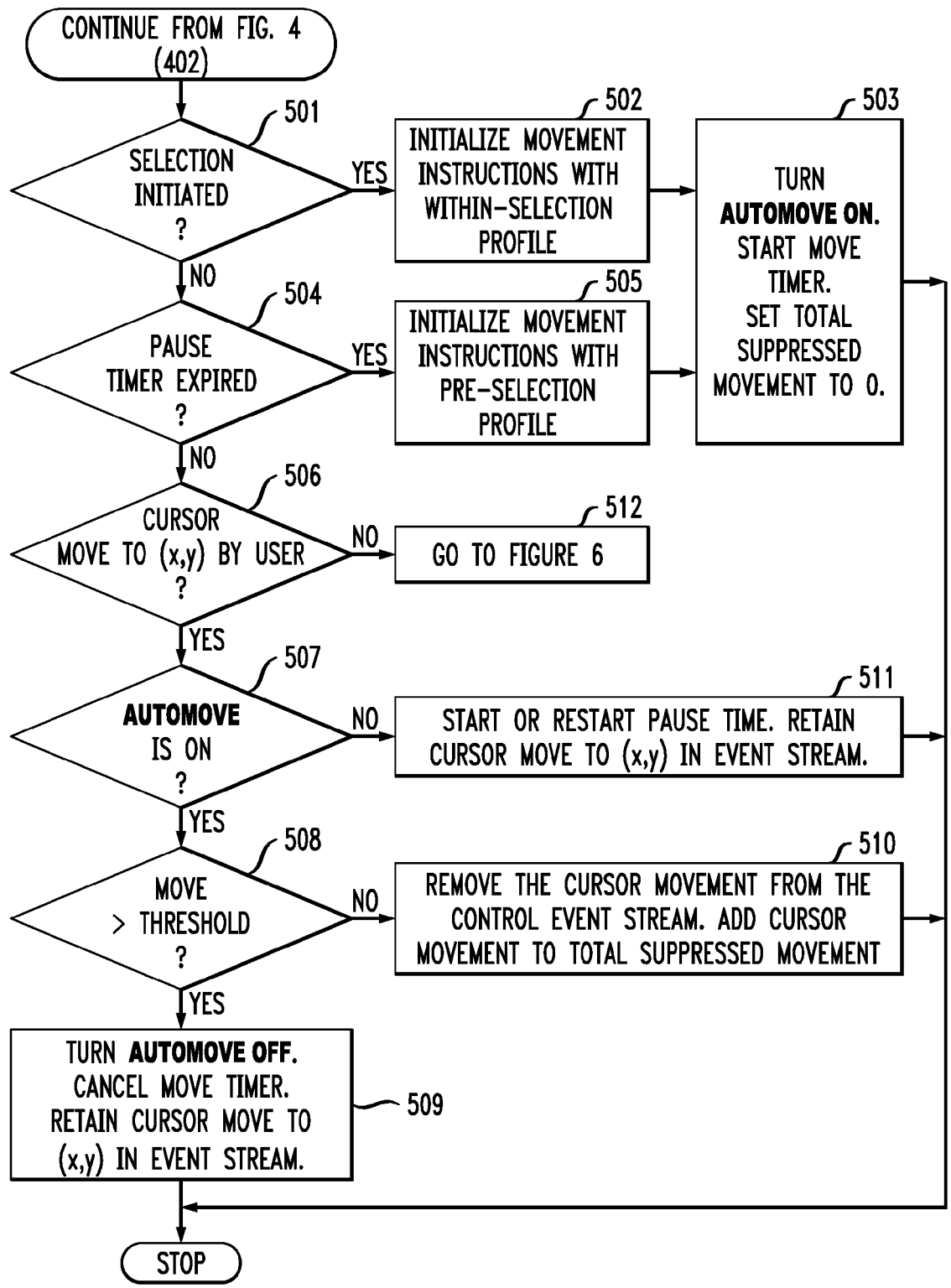
FIG. 5 is a continuation of the flow chart of FIG. 4.

The system 215 maintains several items of state information in order to make decisions. AUTOMOVE 311 is a variable indicating whether automatic movement is currently active. Selection 312 may be active or inactive. It is active when a selection has been initiated and not yet terminated. The AUTOMOVE profile 313 is a set of values (described more fully in FIG. 7) describing the form of automatic movement to be made. The AUTOMOVE movement status 314 describes the current position within the movement profile, and is illustrated in mote detail in FIG. 8. The current cursor position 315 records where the cursor is located on the target display. When AUTOMOVE is active, the system also maintains a count of the distance the user has moved the cursor during the automatic cursor movement 316. In one embodiment, small amounts of cursor movement are suppressed during this period, while a total movement greater than a threshold will terminate the AUTOMOVE. Other embodiments may take alternative actions such as to suppress all cursor movement initiated by the user during an AUTOMOVE, or to cancel an AUTOMOVE as soon as any user-initiated cursor movement is detected. The system 215 provides the target with control events including 'clicks' (selections) 321, cursor moves 323, initiation 324 and termination 325 of selections, and other events received 326 from the cursor/selection device In FIGS. 4-6, it is assumed that the system 215 is configured such that both pre-selection and within selection AUTOMOVES are active. FIG. 4 illustrates the procedure followed by the system 215 whenever a control or timer event is received First, the system checks if a selection event is currently in progress, at 401. If not, then the procedure described in FIG. 5 is followed, as at 402 If a selection is in progress, then the system checks if the event received was an event indicating that the selection is to be terminated, as at block 403 (for example a mouse button has been released). If the event is the end of a selection, then the system generates a selection action (e.g. a click) at the current cursor position, at block 404. In some embodiments, the input event stream may also contain a selection event, in which case one of the two events would be suppressed. The system would then stop automatic movement (AUTOMOVE) if it was active, as shown at step 405, and cancel any active move timers.

If the event received was not a 'terminate selection' event, the system can check whether it was a cursor move event caused by the user, as shown at 406. If it was such an event, and if AUTOMOVE is active, as determined at 407, and if the cursor movement exceeds a threshold distance, as determined at 408, then the cursor move is passed on to the target 409 and any AUTOMOVE is cancelled as shown at block 405 The distance moved may be calculated in several ways, but in one embodiment one can calculate the total cursor displacement initiated by the user since the AUTOMOVE was started, and compare this to a threshold. If the total cursor movement does not exceed the threshold, then the movement would be filtered out of the control event stream and not passed on to the target, as depicted at 410 The total suppressed movement variable would be incremented. If no AUTOMOVE was active, the user's cursor movement would be passed on to the target unchanged as shown at 411 and no other action would be taken. If the event received is not a cursor movement, then the procedure described in FIG. 6 is followed as per block 412

FIG. 5 illustrates the procedure followed by the system when a control or timer event is received and no selection is in progress. If the event is an 'initiate selection' event 501, the system initializes the movement instructions for an AUTOMOVE as at 502, using the configuration settings for AUTOMOVEs within a selection (the WITHIN-SELECTION profile). It then activates an AUTOMOVE, 503, starts the move timer, and initializes the variables that store the total user movement that has been suppressed. If the event received was an indication that the Pause timer has expired, as at block 504, then the system initializes the movement instructions for an AUTOMOVE 505, using the configuration settings for AUTOMOVEs prior to a selection (the PRE-SELECTION profile). It then activates an AUTOMOVE as at 503, starts the move timer, and initializes the variables that stole the total user movement that has been suppressed If the event received is a cursor movement, as at block 506, and if AUTOMOVE is active, as determined at 507, and if the cursor movement exceeds a threshold distance as per 508, then the cursor move is passed on to the target at 509, the Move timer is cancelled, and any AUTOMOVE is cancelled. The distance moved may be calculated in several ways, but in one embodiment one can calculate the total cursor displacement initiated by the user since the AUTOMOVE was started, and compare this to a threshold. If the total cursor movement does not exceed the threshold, then at block 510 the movement would be filtered out of the control event stream and not passed on to the target The total suppressed movement variable would be incremented. If no AUTOMOVE was active, then at block 511 the user's cursor movement would be passed on to the target unchanged and the Pause timer would be started, or cancelled and restarted if it was already active. If the event received is not a cursor movement, then the procedure described in FIG. 6 is followed as shown at block 512.

Figure 6:
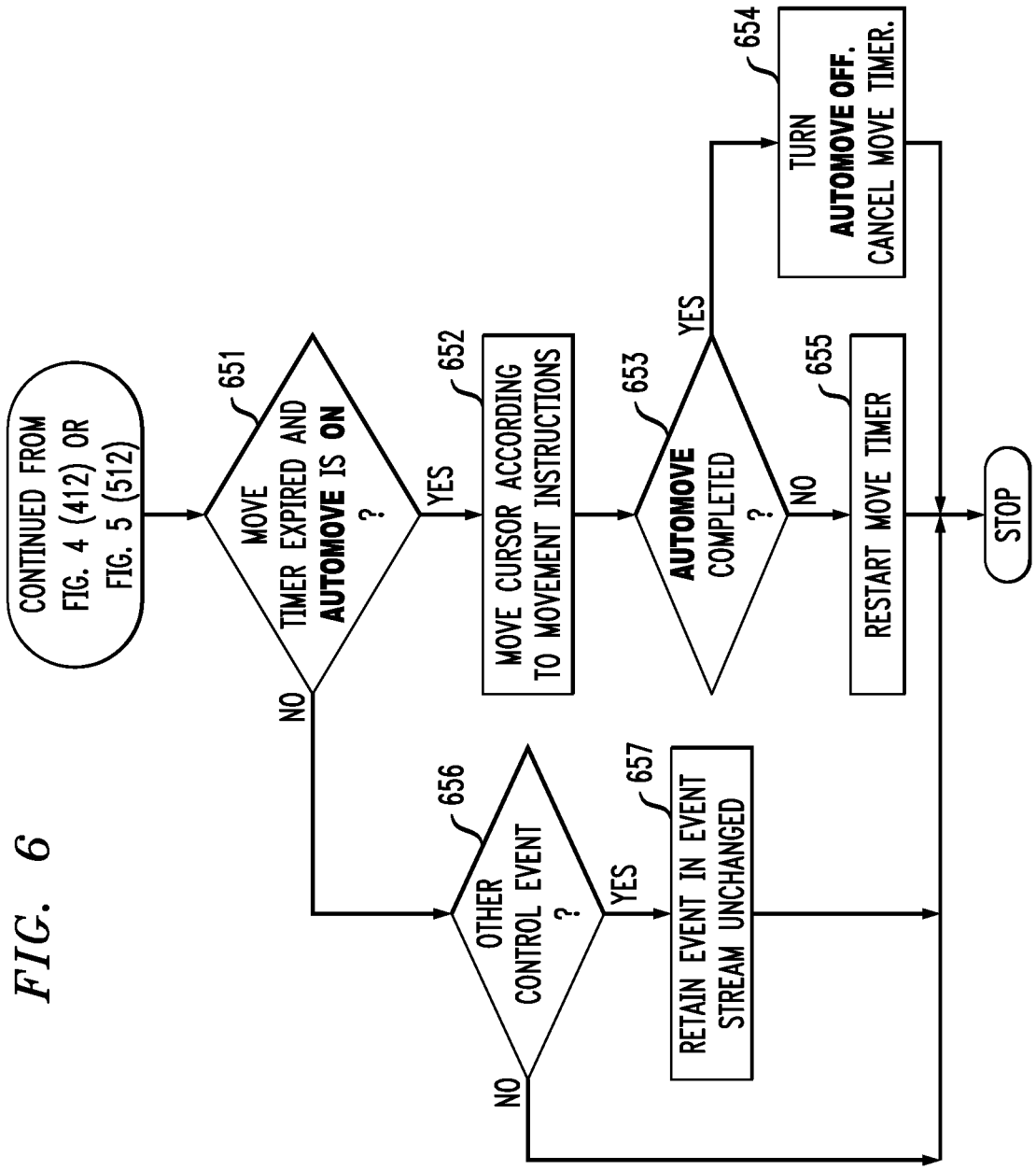
FIG. 6 is a continuation of the flow charts of FIGS. 4 and 5.
Figure 9:
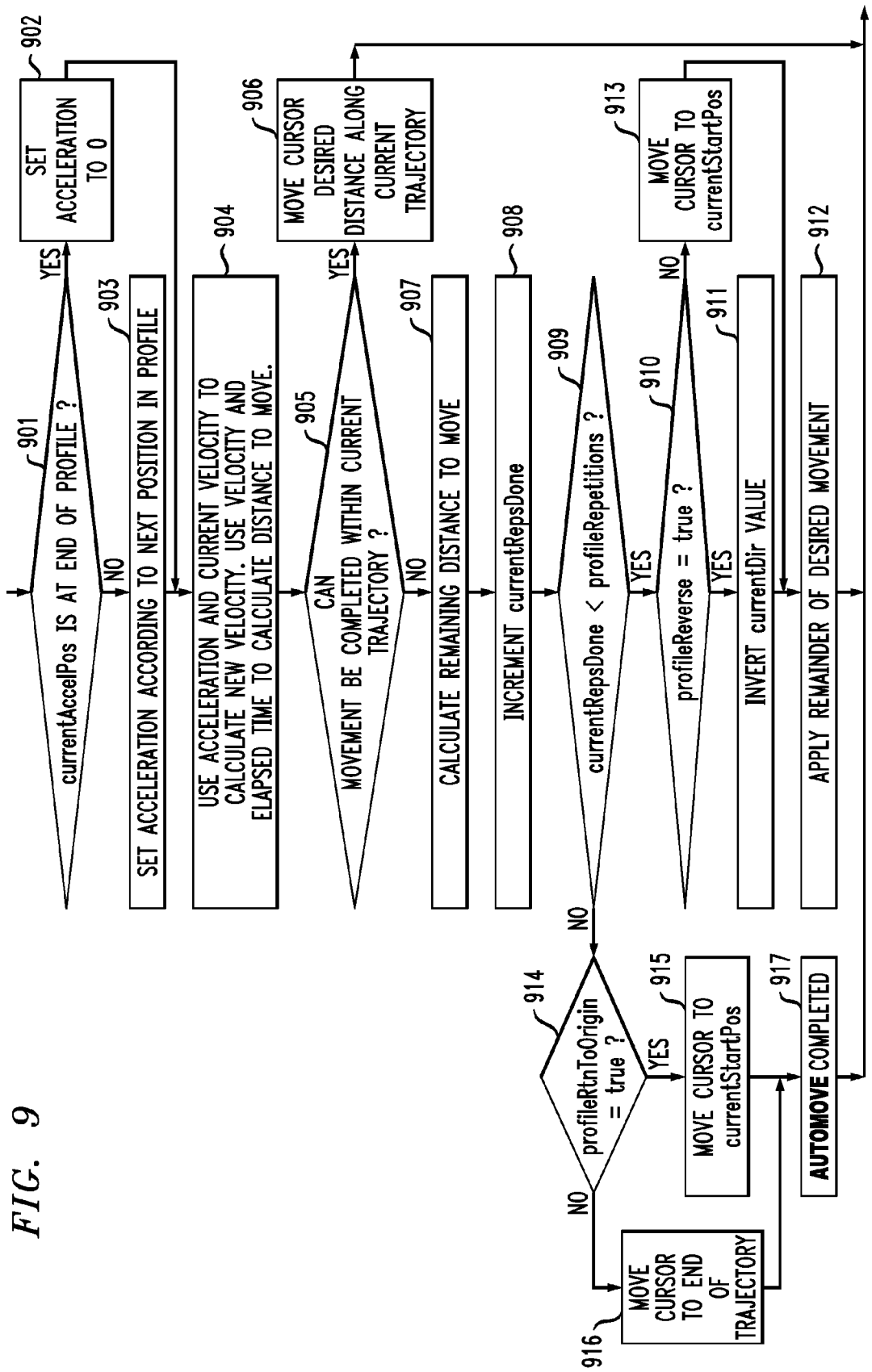
FIG. 9 depicts an exemplary flow chart for automatic movement in accordance with FIGS. 7 and 8.

FIG. 6 illustrates the procedure followed by the system for events not handled in FIG. 4 or 5. If the event received is the expiration of a Move timer 651, and if AUTOMOVE is currently active, then at 652, the system moves the cursor according to the movement instructions indicated by the current movement profile and the AUTOMOVE movement status. The contents of a movement profile are illustrated in FIG. 7, and the content of an AUTOMOVE movement status are illustrated in FIG. 8. The procedure followed in deciding what cursor movement to follow is illustrated in FIG. 9 When the movement has been applied, the system checks whether the AUTOMOVE has now been completed, at 653. If so, at step 654, AUTOMOVE is turned off and the Move timer is cancelled. If not, at step 655, the Move timer is restarted. If the event received is any other control event not yet handled, as determined at 656, it is passed on to the target unchanged as shown at step 657

FIG. 7 illustrates the information stored in a typical AUTOMOVE profile. The profile specifies the movement trajectory to be followed (profileMT). For example, a straight line at a given angle, or a spiral The profile specifies the initial velocity with which the cursor will be moved along the trajectory (profileStartVelocity), and the acceleration profile to be followed (profileAP). For example, the cursor could move at a constant speed, or it could start slowly and then accelerate to a higher speed, and then retain that constant speed for the remainder of the movement. The profile also specifies whether alternate repetitions of the movement trajectory should be reversed (profileReverse), to give a smooth movement path. If this flag is not selected then repetitions of the path will cause the cursor to jump back to the starting position and repeat the movement. The profile specifies how many repetitions of the movement are to be followed (profileRepetitions), and whether the cursor is to be returned to its original position after these repetitions have been completed (profileRtnToOrigin).

FIG. 8 illustrates the state information that the system would store when an AUTOMOVE is active. This information captures the current position within the movement sequence, and allows the system to calculate what automatic movement should be performed every time the Move timer expires. The status information captures the current location of the cursor within the movement trajectory (currentMvmtPos), the current direction of movement (currentDir), the current movement velocity (currentVelocity), the location within the acceleration profile (currentAccelPos), the number of repetitions that have been completed (currentRepsDone), and the screen position from which the AUTOMOVE was started (currentStartPos).

FIG. 9 is a flow chart illustrating the procedure followed to determine the automatic cursor movement that should be taken during an AUTOMOVE, given an AUTOMOVE profile as described in FIG. 7 and an AUTOMOVE movement starts as described in FIG. 8. If, as determined at block 901, the position within the acceleration profile is at the end of the profile, then an acceleration value of 0 is set at step 802. Otherwise, as at 803, the current acceleration is found from the acceleration profile and the position is incremented. The acceleration and current velocity are then used in block 904 to calculate the velocity for this movement. The velocity and elapsed time since the last movement are used to calculate the distance to be moved, also in step 804. The system then calculates, at 905, whether the desired movement can be completed within the current trajectory. If so, then at 906, the cursor is moved the desired distance along the current trajectory. If not, at 907, the system calculates the distance remaining after the current trajectory has been completed.

Figure 10:
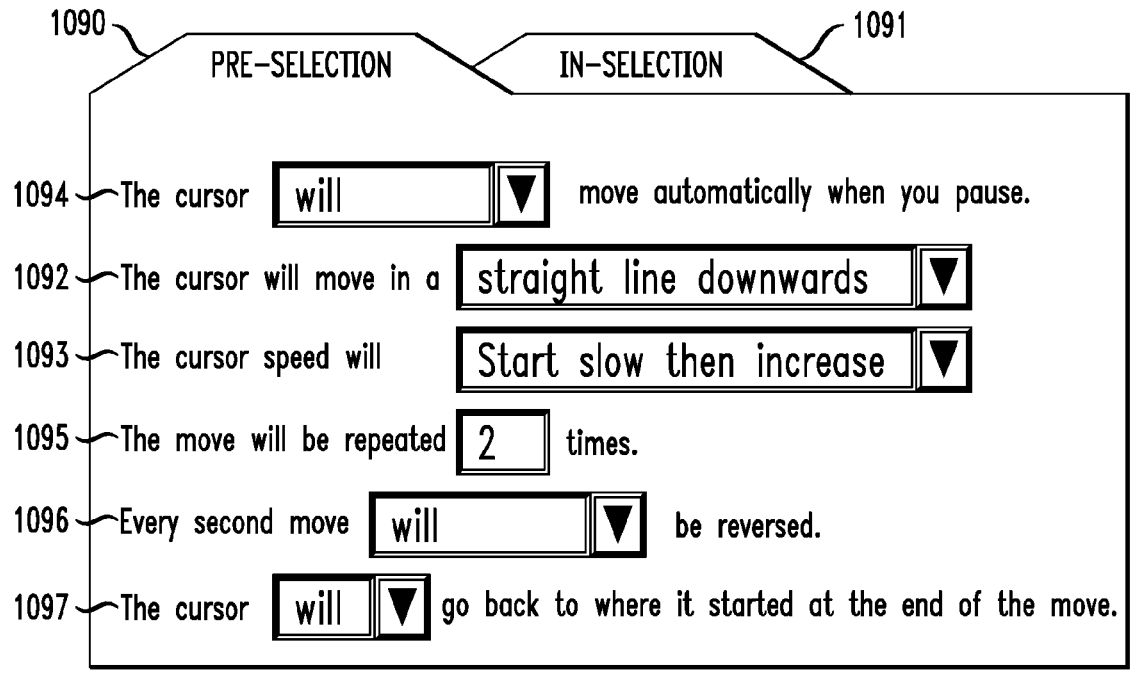
FIG. 10 depicts exemplary aspects of a configuration system in accordance with an embodiment of the invention.

The number of repetitions completed (currentRepsDone) is incremented at 908. If, as determined at 909, the number of repetitions completed is less than the number needed, then a new repetition is started. The direction of the repetition is set according to the profileReverse flag. It, as per 910, the flag indicates a reversal, then at 911 the currentDir value is inverted and at 912 the remaining movement is applied along the new trajectory, updating the currentMvmtPos value If the flag does not indicate reversal, then at 913 the new position is calculated from the original starting position of the AUTOMOVE (currentStartPos). It no further repetitions are needed, and it is determined at 914 that the profile calls for the cursor to be returned to its starting point, at 915, the cursor position is set to currentStartPos, and at 917 the AUTOMOVE is marked as being completed. If no further repetitions are needed, but the cursor does not indicate a return to the starting position, then at 916, the cursor position is set to the end of the movement trajectory, and at 917 the AUTOMOVE is marked as being completed FIG. 10 illustrates an embodiment of the user interface of the configuration system 219 shown in FIG. 2. The user is able to separately configure, and turn on and off, as shown at 1094, AUTOMOVES on pausing (pre-selection), 1090, and AUTOMOVEs during selection (In-selection), 1091 The user is offered choices for the trajectory 1092, and initial velocity and acceleration profiles 1093. In this example, initial velocity and acceleration are combined, but alternative embodiments could separate them, and give the user greater flexibility in specifying the initial direction of movement, and shape of the movement (e.g. straight line, spiral, zig zag). The user can also choose the number of repetitions 1095), whether to reverse alternate repetitions 1096, and whether to return to the starting position at the end, 1097. There are many additional configuration options that could be included; for example, the threshold of user movement that is suppressed during an AUTOMOVE, or the visual appearance of the indicator that shows the movement path.

In one embodiment of the invention, the system is provided as a utility program available to a user of a desktop computer system It can be activated and deactivated via a control panel, and various features of its behavior can be configured. The preferred set of configuration options is illustrated in FIG. 10. Through configuration, the user can choose whether to have automatic movement only prior to selection, only during selection, or both prior to and during selection. He or she can also choose whether to have the cursor move in a straight line at a specific angle, or a spiral. Different options can be chosen for the pre-selection and during selection movements. The user can also choose different movement trajectories for movement made before selection and during selection. Other options allow the user to select the movement velocity and acceleration profile, the number of times the trajectory should be followed, and whether to reverse every second movement, so that the cursor follows a path and then reverses it to get back to the starting point, or follows a path and then jumps back to the starting point and repeats it. A separate option specifies whether the cursor should be returned to its starting position when all movement iterations have been completed.

In this embodiment, the user controls cursor movement on the computer display using a standard computer mouse. He or she initiates a selection action by pressing down the left mouse button, and terminates the action by releasing the left mouse button. In the default configuration, the system performs automatic movement only during a selection action The default movement direction is vertically downwards with a constant, fairly slow velocity. After reaching the end of the trajectory the movement is reversed. When the cursor returns to its original position the movement is stopped. The movement path is displayed on the screen. In the default mode of operation it is shown as a colored bar extending vertically downwards from the on-screen cursor image. This bar is always visible even when no selection is active. When movement is active, the cursor moves along this bar.

Figure 11:
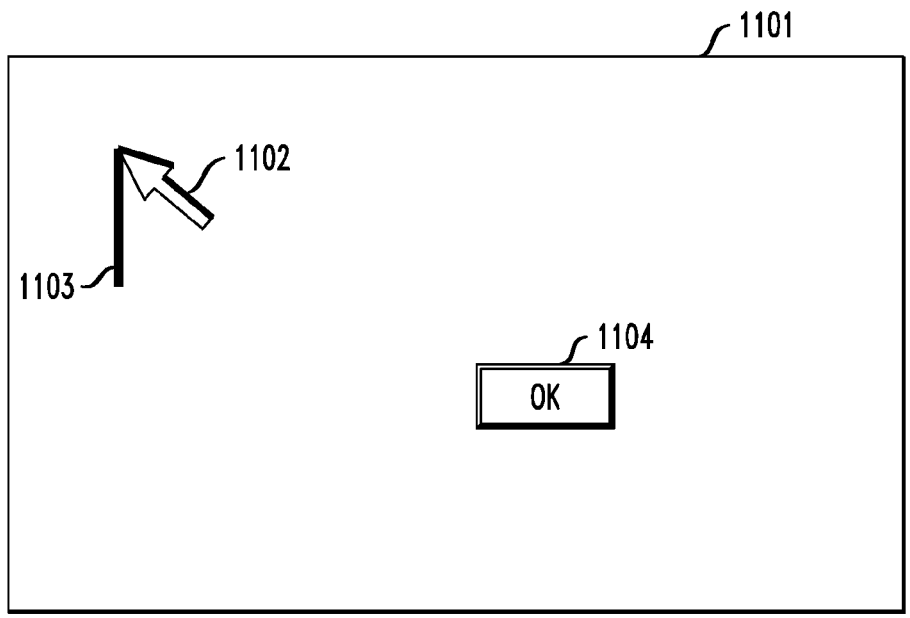
FIGS. 11-14 depict exemplary views of a display employing certain inventive techniques.
Figure 12:
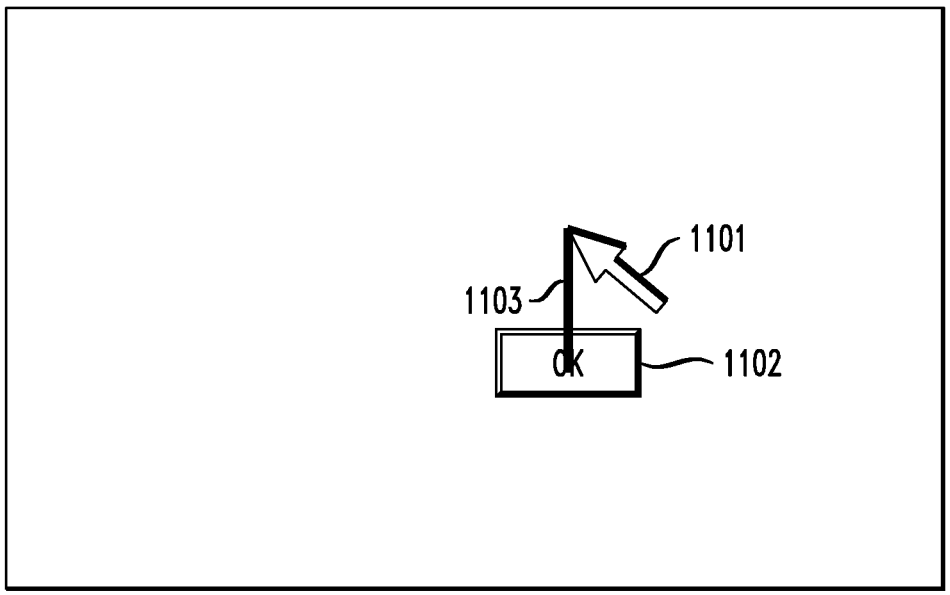
Figure 13:
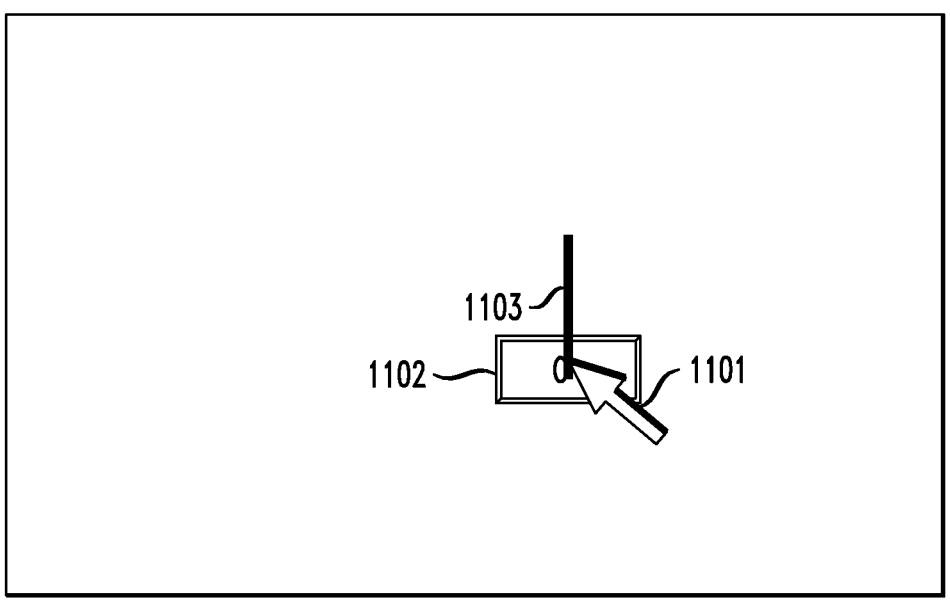
Figure 14:
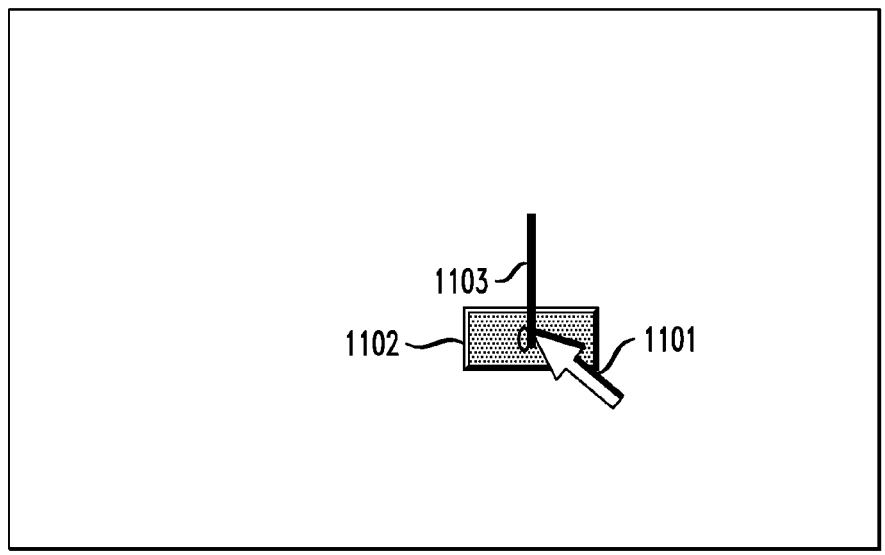

This mode of operation is illustrated in FIGS. 11 to 14. These figures show the display screen 1101, the on-screen appearance of the cursor 1102, and an associated display element representing the AUTOMOVE trajectory 1103. In FIGS. 11-14, the trajectory is shown as a line extending vertically downwards from the cursor, and it moves with the cursor. The figures show a single on-screen target 1104, an acceptance button typically used in software applications to confirm a command for the system to take some action. FIG. 11 illustrates the appearance of the screen before the user starts to move. FIG. 12 illustrates the screen appearance when the user has moved the cursor 1101 near to the target 1102. Note that although the cursor itself is not on the target, the vertical bar 1103 does cross the target. The user knows that an AUTOMOVE from this position will place the cursor over the target. The user then initiates a selection action by pressing down the left mouse button. As illustrated in FIG. 13, he or she holds down the mouse button, and the cursor 1101 position moves along the line 1103. When the cursor 1101 position is over the target 1102, the user releases the mouse button to terminate the selection. As shown in FIG. 14, this causes the system to generate a click event at the current position of the cursor 1101, and the desired target 1102 is selected.

A variety of techniques, utilizing dedicated hardware, general purpose processors, firmware, software, or a combination of the foregoing may be employed to implement the present invention One or more embodiments of the invention can be implemented in the form of a computer product including a computer usable medium with computer usable program code for performing the method steps indicated furthermore, one or more embodiments of the invention can be implemented in the form of an apparatus including a memory and at least one processor that is coupled to the memory and operative to perform exemplary method steps.

Figure 15:
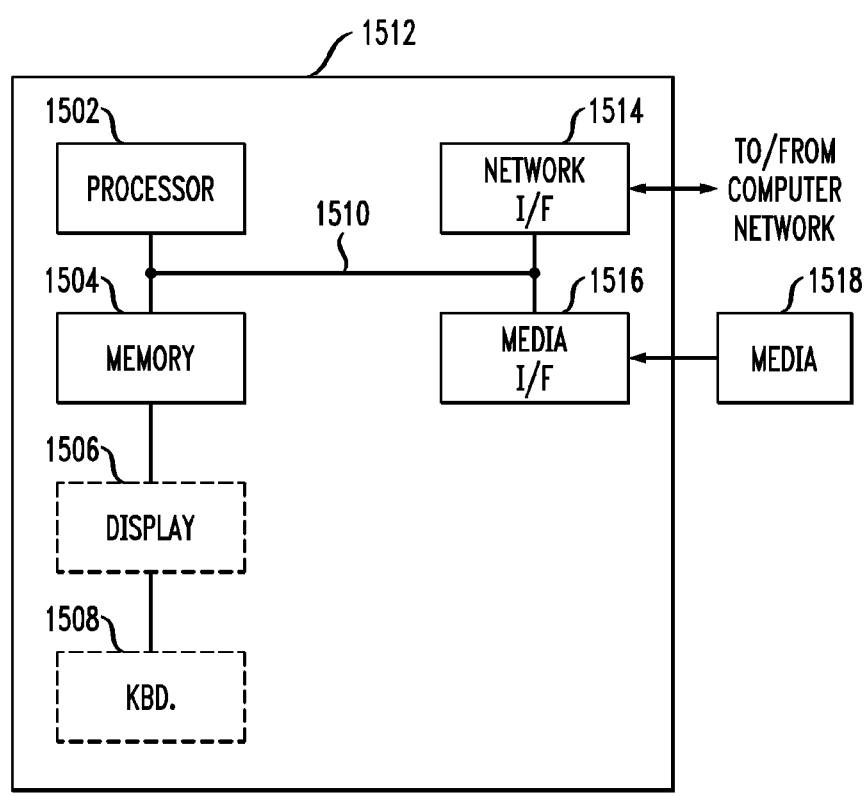
FIG. 15 depicts a computer system that may be useful in implementing one or more aspects and/or elements of the present invention

At present, it is believed that the preferred implementation will make substantial use of software running on a general purpose computer or workstation. With reference to FIG. 15, such an implementation might employ, for example, a processor 1502, a memory 1504, and an input/output interface formed, for example, by a display 1506 and a keyboard 1508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (e.g., hard drive), a removable memory device (e.g., diskette), a flash memory and the like. In addition, the phrase "input/output interface" as used herein, is intended to include, for example, one or more mechanisms for inputting data to the processing unit (e.g., mouse, trackball, joystick), and one or more mechanisms for providing results associated with the processing unit (e.g., printer). The processor 1502, memory 1504, and input/output interface such as display 1506 and keyboard 1508 can be interconnected, for example, via bus 1510 as part of a data processing unit 1512. Suitable interconnections, for example via bus 1510, can also be provided to a network interface 1514, such as a network card, which can be provided to interface with a computer network, and to a media interface 1516, such as a diskette or CD-ROM drive, which can be provided to interface with media 1518

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU Such software could include, but is not limited to, firmware, resident software, microcode, and the like.

Furthermore, the invention can take the form of a computer program product accessible from a computer-usable or computer-readable medium (e.g., media 1518) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (e g memory 1504), magnetic tape, a removable computer diskette (e.g. media 1518), a random access memory (RAM), a read-only memory (ROM), a rigid magnetic disk and an optical disk Current examples of optical disks include compact disk-read only memory (CD-ROM), compact disk-read/write (CD-R/W) and DVD.

A data processing system suitable for storing and/or executing program code will include at least one processor 1502 coupled directly or indirectly to memory elements 1504 through a system bus 1510. The memory elements can include local memory employed during actual execution of the program code, bulk storage, and cache memories which provide temporarily storage of at least some program code in order to reduce the number of times code must be retrieved from bulk storage during execution.

Input/output or I/O devices (including but not limited to keyboards 1508, displays 1506, pointing devices, and the like) can be coupled to the system either directly (such as via bus 1510) or through intervening I/O controllers (omitted for clarity).

Network adapters such as network interface 1514 may also be coupled to the system to enable the data processing system to become coupled to other data processing systems or remote printers or storage devices through intervening private or public networks Modems, cable modem and Ethernet cards are just a few of the currently available types of network adapters.

In any case, it should be understood that the components illustrated herein may be implemented in various forms of hardware, software, or combinations thereof, e.g., application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method of choosing at least one position on a display having a cursor, comprising the steps of: analyzing multiple parameters of a first user-initiated action of a cursor to determine a during-selection mode associated with the cursor, wherein said multiple parameters comprise (i) a trajectory of the cursor, (ii) an initial velocity of the cursor, (iii) an acceleration profile of the cursor, (iv) a number of repetitions of the first user-initiated action, and (v) a location of the cursor subsequent to the first user-initiated action;

automatically moving the cursor in accordance with the determined during-selection mode, wherein a path of said automatic movement of said cursor in the determined during-selection mode is determined prior to said first user-initiated action;
responsive to a second user-initiated action when the cursor is at a first location:
ceasing said moving of the cursor in said determined during-selection mode;
causing a choosing action to be performed at said first location;
generating a selection event of a target item upon completion of performance of the choosing action at the first location; and
during said automatic moving of the cursor in said determined during-selection mode, suppressing during-selection cursor movement from being modified by a user input movement, unless said user input movement exceeds a user input movement threshold for said determined during-selection mode;
wherein one or more steps of said method are performed by one or more hardware devices.

2. The method of claim 1, further comprising the additional steps of:
responsive to a pre-selection automatic movement-initiating action, automatically moving the cursor in a predetermined pre-selection mode; and
responsive to said first user-initiated action:
ceasing said moving of the cursor in said predetermined pre-selection mode; and
commencing said automatic moving of the cursor in said determined during-selection mode.

3. The method of claim 2, wherein said pre-selection automatic movement-initiating action comprises a pause in user-initiated cursor motion.

4. The method of claim 3, wherein said user-initiated cursor motion is effected via a human-operated pointing device.

5. The method of claim 2, wherein said pre-selection automatic movement-initiating action comprises an explicit user action.

6. The method of claim 2, further comprising the additional step of obtaining an input causing one of said determined during-selection and pre-selection modes of motion to become inactive.

7. The method of claim 2, wherein said first user-initiated action is effected via depressing a button on one of a keypad and a pointing device.

8. The method of claim 2, wherein said second user-initiated action comprises releasing a button on one of a keypad and a pointing device.

9. The method of claim 2, further comprising the additional step of facilitating display of a projected cursor trajectory in accordance with at least one of said determined during-selection and pre-selection modes of moving said cursor.

10. The method of claim 9, further comprising the additional step of canceling at least one of said determined during-selection and pre-selection modes of moving said cursor, responsive to obtaining a user-inputted cursor movement during said at least one of said determined during-selection and pre-selection modes of moving said cursor.

11. The method of claim 2, wherein the display is associated with a computer having a pointing device and an operating system, further comprising the additional step of filtering a stream of events passing from the pointing device to the operating system.

12. A computer-implemented method of choosing at least one position on a display having a cursor, comprising the steps of: analyzing multiple parameters of a pre-selection automatic movement- initiating action of a cursor to determine an automatic movement associated with the cursor, wherein said multiple parameters comprise (i) a trajectory of the cursor, (ii) an initial velocity of the cursor, (iii) an acceleration profile of the cursor, (iv) a number of repetitions of the first user-initiated action, and (v) a location of the cursor subsequent to the first user-initiated action;
automatically moving the cursor in a path according to said automatic movement associated with the cursor;
responsive to a user-initiated action when the cursor is at a first location:
ceasing said automatic movement associated with the cursor;
causing a choosing action to be performed at the first location, wherein one or more steps of said method are performed by one or more hardware devices; and
generating a selection event of a target item upon completion of performance of the choosing action at the first location; and
during said automatic movement of the cursor, suppressing pre-selection cursor movement from being modified by a user input movement, unless said user input movement exceeds a user-movement threshold.

13. The method of claim 12, wherein said pre-selection automatic movement-initiating action comprises a pause in user-initiated cursor motion.

14. The method of claim 12, wherein said pre-selection automatic movement-initiating action comprises an explicit user action.

15. A computer program product comprising a non-transitory tangible computer useable readable recordable storage medium having computer useable program code for choosing at least one position on a display having a cursor, said computer program product including: computer useable program code for analyzing multiple parameters of a first user-initiated action of a cursor to determine a during-selection mode associated with the cursor, wherein said multiple parameters comprise (i) a trajectory of the cursor, (ii) an initial velocity of the cursor, (iii) an acceleration profile of the cursor, (iv) a number of repetitions of the first user-initiated action, and (v) a location of the cursor subsequent to the first user-initiated action;
computer useable program code for automatically moving the cursor in accordance with the determined during-selection mode, wherein a path of said automatic movement of said cursor in the determined during-selection mode is determined prior to said first user- initiated action;
computer useable program code for, responsive to a second user-initiated action when the cursor is at a first location:
ceasing said moving of the cursor in said determined during-selection mode;
causing a choosing action to be performed at said first location; and
generating a selection event of a target item upon completion of performance of the choosing action at the first location;
wherein one or more steps of said method are performed by one or more hardware devices; and
during said automatic moving of the cursor in said determined during-selection mode, suppressing during-selection cursor movement from being modified by a user input movement, unless said user input movement exceeds a user input movement threshold for said determined during-selection mode.

16. The computer program product of claim 15 wherein said product further comprises:

computer useable program code for, responsive to a preselection automatic movement initiating action, automatically moving the cursor in a predetermined pre-selection mode; and computer useable program code for, responsive to said first user-initiated action:

ceasing said moving of the cursor in said predetermined pre-selection mode; and commencing said automatic moving of the cursor in said determined during-selection mode.

17. A computer program product comprising a non-transitory tangible computer useable readable recordable storage medium having computer useable program code for choosing at least one position on a display having a cursor, said computer program product including:

computer useable program code for analyzing multiple parameters of a pre-selection automatic movement-initiating action of a cursor to determine an automatic movement associated with the cursor, wherein said multiple parameters comprise (i) a trajectory of the cursor, (ii) an initial velocity of the cursor, (iii) an acceleration profile of the cursor, (iv) a number of repetitions of the first user-initiated action, and (v) a location of the cursor subsequent to the first user-initiated action;

computer useable program code for automatically moving the cursor in a path according to said automatic movement associated with the cursor;

computer useable program code for, responsive to a user-initiated action when the cursor is at a first location:

ceasing said automatic movement associated with the cursor;

causing a choosing action to be performed at the first location; and generating a selection event of a target item upon completion of performance of the choosing action at the first location; and computer useable program code for, during said automatic movement of the cursor, suppressing pre-selection cursor movement from being modified by a user input movement, unless said user input movement exceeds a user-movement threshold.

* * * * *